United States Patent
Li et al.

(10) Patent No.: US 7,564,212 B2
(45) Date of Patent: Jul. 21, 2009

(54) MOBILE COMMUNICATION DEVICE WITH SOLAR CELL

(75) Inventors: Yun Li, Taipei (TW); Guoqiang Tang, Taipei (TW); David Ho, Taipei (TW)

(73) Assignee: Inventec Appliances Corp., Taipei (TW)

( * ) Notice: Subject to any disclaimer, the term of this patent is extended or adjusted under 35 U.S.C. 154(b) by 398 days.

(21) Appl. No.: 11/419,355

(22) Filed: May 19, 2006

(65) Prior Publication Data
US 2006/0261777 A1    Nov. 23, 2006

(30) Foreign Application Priority Data
May 20, 2005    (TW) .............................. 94116599 A

(51) Int. Cl.
*H02J 7/00* (2006.01)
(52) U.S. Cl. ..................................... 320/101
(58) Field of Classification Search ................ 320/101; 455/572; 307/18, 23, 24, 57, 65, 66
See application file for complete search history.

(56) References Cited

U.S. PATENT DOCUMENTS 6,057,665 A * 5/2000 Herniter et al. ............. 320/101

* cited by examiner

*Primary Examiner*—Akm E Ullah
*Assistant Examiner*—Jue Zhang

(57) ABSTRACT

A mobile communication device is provided. The mobile communication device includes a processing unit, a battery unit, a solar cell unit, an electronic switch circuit and an analog to digital converter (ADC). In the mobile communication device, the solar cell unit receives a light and thus a luminance and transforms the luminance into an analog voltage. The ADC is configured to convert the analog voltage into a digital voltage. The processing unit is used to transmit a control voltage according to the digital voltage. In response to the control signal, the electronic switch circuit is controlled to turn the solar cell unit on or off and the solar cell unit provides all, a portion or none of a working current required for the processing unit according to the action of the electronic switch circuit. In addition, a luminance value may be generated according to the light received by the solar cell unit so that a user may be aware of the light quality of the ambient environment, thereby preventing himself/herself from reading under a poor light source environment thus protecting his/her eyesight from being damaged.

15 Claims, 4 Drawing Sheets

MOBILE COMMUNICATION DEVICE WITH SOLAR CELL

FIELD OF THE INVENTION

The present invention relates to a mobile communication device. More particularly, the present invention relates to a mobile communication device having two power sources switched alternatively for use and a displayed luminance value with respect to the ambient environment.

BACKGROUND OF THE INVENTION

The current mobile communication device has become a pocket-size media center, including a digital camera, an Internet browser, a digital TV receiver, a MP3 player capable of high-fidelity audio playing and five sound tracks Hi-Fi stereo and the like. For the mobile communication device, although the lithium ion battery has been improved, it does not live up to the power amount required for the current mobile communication device. Therefore, how to prolong the working time of the battery for the delicate mobile communication device by using the power management technology is important to the designers of this field.

Referring to FIG. 1, a schematic diagram of a conventional mobile communication device is shown therein. The mobile communication device comprises a processing unit 11 and a battery unit 12. The battery unit 12 provides a power supply and thus a working current 111 to the mobile communication device. The battery unit 12 has to be externally charged to maintain the power therein. When the mobile communication device is carried in hand by a user, it can not be charged through a fixed charging device and the power amount in the battery unit 12 will be totally consumed on the condition that the working current 111 has to be continuously maintained. Finally, the mobile communication device is shut off due to the insufficient power in the battery unit 12, causing apparently trouble and inconvenience to the user. Although another spare battery unit may be charged and then used in the mobile communication device, such power scheme is also not satisfactory due to some reasons. One of the reasons is that the user has to carry the spare battery unit in hand so as to be used for the mobile communication when required. Another reason is that the mobile communication device has to be shut off first and then the original battery unit can be replaced with the spare battery unit. Thus, the inconvenience issue still exists.

To address these problems, the applicant of the present invention envisages that a solar cell unit may be used as the spare battery unit in quest of a prolonged battery time. In addition, the solar cell unit can also provide a luminance value of the ambient environment so as to be shown on a display of the mobile communication device so that the user may be informed of the light quality of the ambient environment, thereby preventing himself/herself from reading under a poor light source environment and thus protecting his/her eyesight from being damaged. According to the above motivations, the present invention sets forth a mobile communication device having the solar cell unit, so as to solve the problems encountered in the prior art.

SUMMARY OF THE INVENTION

In accordance with an aspect of the present invention, a mobile communication device is disclosed, which comprises a processing unit, a battery unit functioning as a main power source of the processing unit, a solar cell unit functioning as a spare power source of the processing unit, an electronic switch circuit receiving a control signal generated by the processing unit to turn the solar cell unit on or off.

In an embodiment, the digital voltage is transformed into a luminance value.

In an embodiment, the luminance value represents a warning value.

In an embodiment, the battery unit is a rechargeable battery.

In an embodiment, the solar cell unit is a photoelectric cell.

In an embodiment, the solar cell unit provides a charging current for the battery unit.

In an embodiment, the main power source is supplied with a first working current and the spare power source is supplied with a second working current, wherein when the first working current is greater than the second working current, the control signal controls the electronic switch circuit to turn the solar cell unit off, and when the first working current is less than the second working current, the control signal controls the electronic switch circuit to turn the solar cell unit on.

Other objects, advantages and efficacies of the present invention will be described in detail below taken from the preferred embodiments with reference to the accompanying drawings.

BRIEF DESCRIPTION OF THE DRAWINGS

The foregoing summary, as well as the following detailed description of the preferred embodiments, is better understood when read in conjunction with the appended drawings. It is understood, however, that the invention is not limited to the specific methods and disclosed or illustrated. In the drawings.

DETAILED DESCRIPTION OF THE PREFERRED EMBODIMENT

The present invention discloses a mobile communication device having a solar cell unit serving as a spare power source, which will be described in detail below taken with the preferred embodiments with reference to the accompanying drawings.

Figure 1:
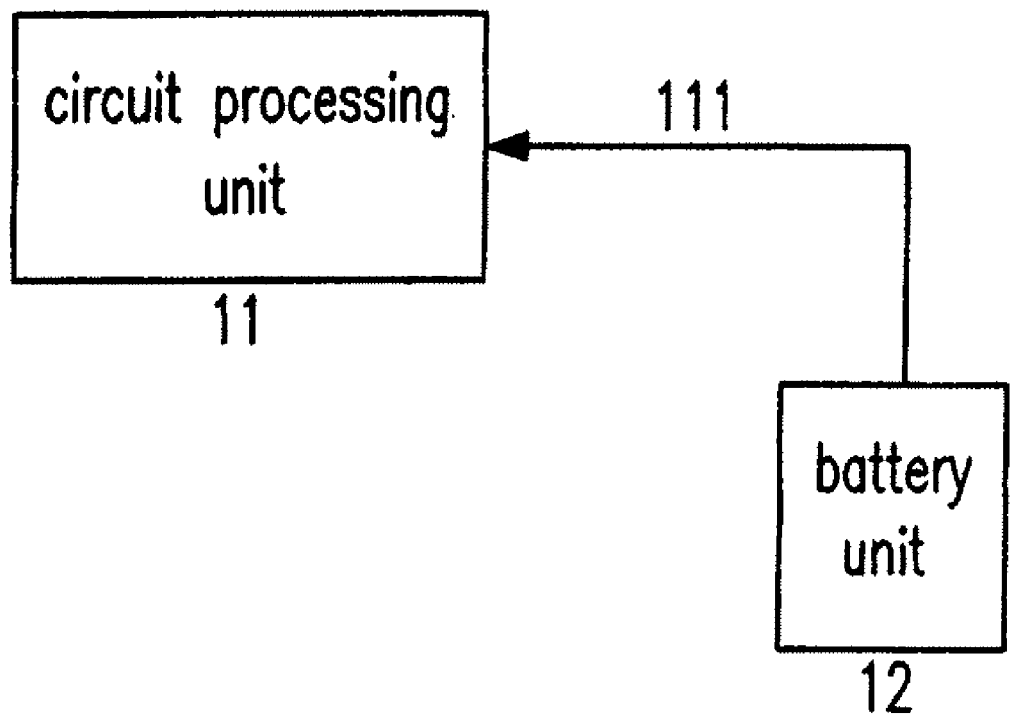
FIG. 1 is a block diagram of a conventional mobile communication device.

Referring to FIG. 1, a block diagram of the mobile communication device according to the present invention is depicted therein. As shown, the mobile communication device comprises a processing unit 11, a battery unit 12, a solar cell unit 21, an electronic switch circuit 22 and an analog-to-digital converter (ADC) 23. The processing unit 11 receives a working current 111 continuously from the battery unit 12. The battery unit 12 functions as a main power source of the processing unit 11 and the solar cell unit 21 functions as a spare power source. Upon receiving a light, the solar cell unit 21 converts the light into a power source through the mechanism of photoelectric conversion. The power source provides a power in an analog form (an analog voltage) 112, which is subsequently transmitted to the ADC 23. In the ADC 23, the analog voltage 112 is converted into a digital voltage 114. Next, the digital voltage 114 is transmitted to the processing unit 11. In response to the digital voltage 114, the processing unit 11 transmits a proper control signal 115 to the electronic switch circuit 22 and the electronic switch circuit 22 is controlled to turn the solar cell unit 21 on or off. Namely, when the solar cell unit 21 is turned on, the solar cell unit 21 provides power for the processing unit 11; and when the solar cell unit 21 is turned off, the solar cell unit doesn't provide power for the processing unit 11. If the light received by the solar cell unit 12 has a less value of luminance than an average luminance value and the working current 111 from the battery unit 12 is greater than the working current 112 from the solar cell unit 21, the electronic switch circuit 22 is controlled to turn the solar cell unit off. At this time, the battery unit 12 provides continuously the working current 111 required for the processing unit 11 so that the mobile communication device may keep working normally. It is to be noted that the mobile communication device may do without the electronic switch circuit 22 since any element therein can achieve the same function may be used in replace thereof.

Figure 2:
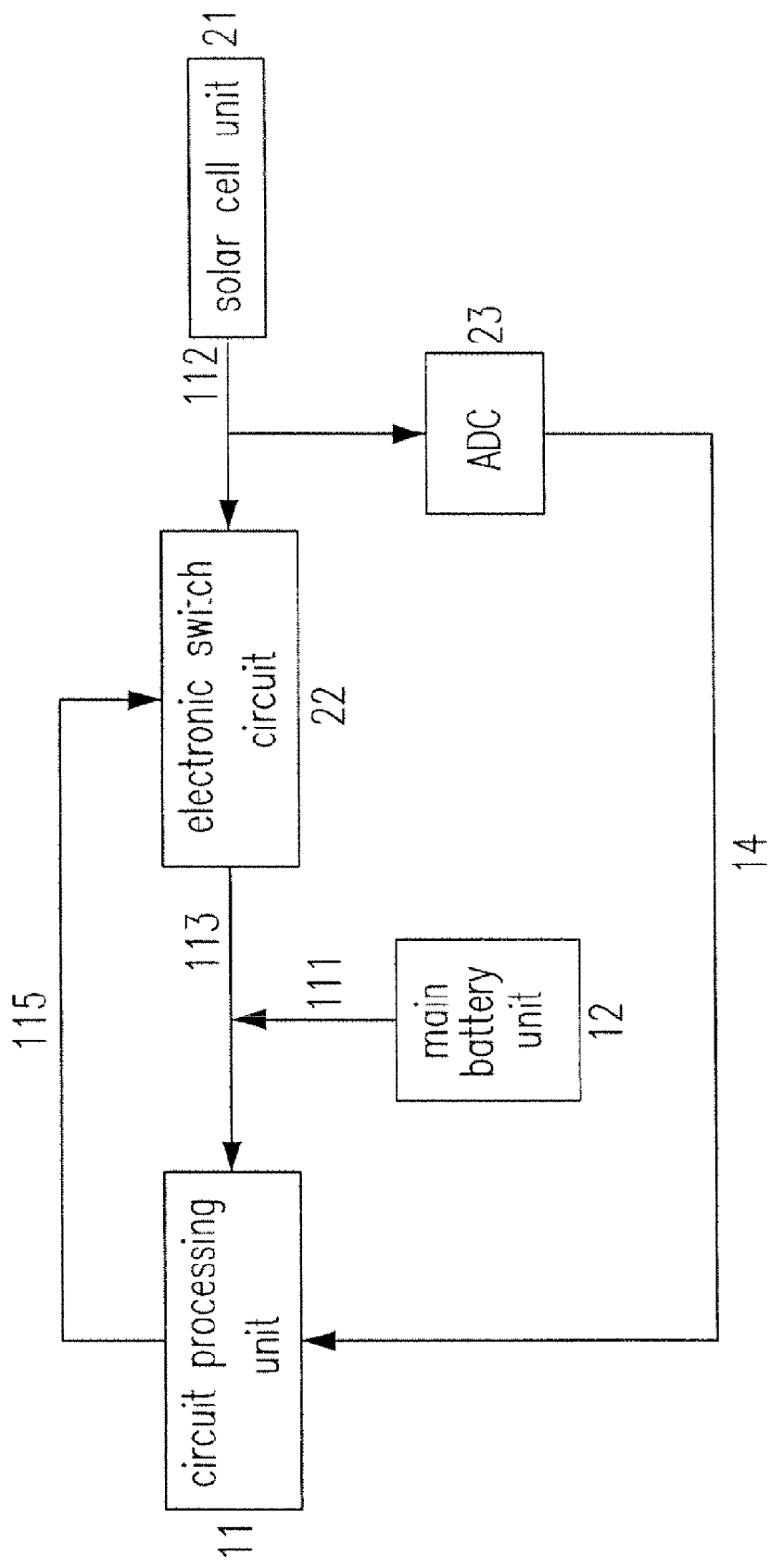
FIG. 2 is a block diagram of a mobile communication device according to the present invention.
Figure 3:
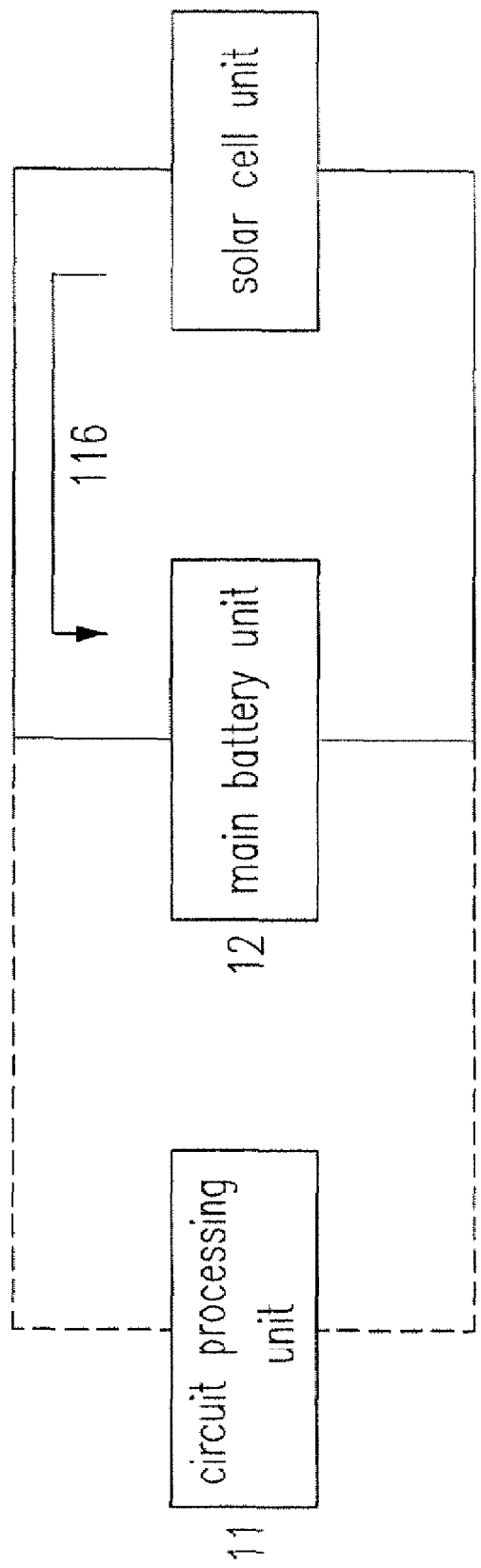
FIG. 3 is a schematic diagram showing that a main battery unit is charged by a spare battery unit in the mobile communication device according to the present invention.

Referring to FIG. 3, when the light received by the solar cell unit 21 has a greater value of luminance than that of the average luminance, the solar cell unit 21 generates a charging current 116 to charge the battery unit 12. At this time, the solar cell unit 21 provides an analog voltage 112 for the ADC 23, which is subsequently converted into a digital voltage 114. Then, the digital voltage 114 is transmitted to the processing unit 11 where the digital voltage 114 is transformed into a luminance value. This concept may be understood by referring also to FIG. 2. By providing an application program as an upper layer of the processing unit 11, the luminance value may be processed and then shown on a display (see FIG. 4) of the mobile communication device. By means of the displayed luminance value, a user may be aware of the light quality in the ambient environment. When the light received by the solar cell unit 21 has a value of luminance equal to the average luminance value and the working current 111 from the battery unit 12 is less than the working current 112 from the solar cell unit 21, the electronic switch circuit 22 is controlled to turn the solar cell unit 21 on. At this time, the working current required for the processing unit 11 is supplied by the solar cell unit 21 and the battery unit 12, where a larger portion of the required working current is supplied by the solar cell unit 21 (the working current 112) and a smaller portion of the required working current is supplied by the battery unit 12 (the working current 111). In this manner, the mobile communication device keeps working normally. When the light received by the solar cell unit 21 has a luminance value greater than the average luminance value and the working current of the battery unit 22 is very small, the electronic switch circuit 22 is controlled to turn the solar cell unit 21 on. At this time, the solar cell unit 21 provides all of the working current 113 required for the processing circuit unit 11 alone. In this manner, the mobile communication device keeps working normally.

Figure 4:
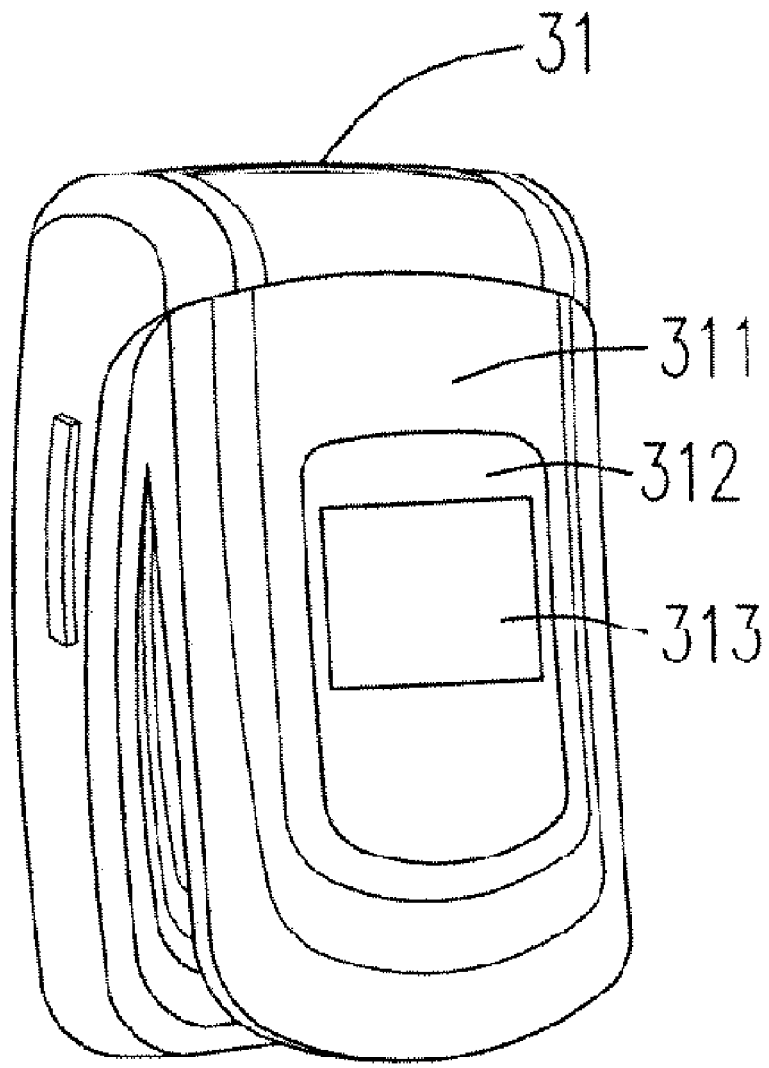
FIG. 4 is a schematic diagram of an outline of the mobile communication device according to the present invention.

Referring to FIG. 4, an outline of the mobile communication device according to the present invention is schematically shown therein. As shown, the mobile communication device 31 has a flappable cover 311 on which a solar energy receiving material 312 is bonded so that the solar energy may be received to serve as the spare power source. As above mentioned, the received solar energy through the solar energy receiving material 312 may be transformed into a luminance value and then shown on the display 313 of the mobile communication device 31. By means of the luminance value, the user may be aware of the light quality in the ambient environment, thereby preventing himself/herself from reading under a poor light source environment and thus protecting his/her eyesight from being damaged.

In conclusion, since the mobile communication device is provided with the spare power source obtained from the solar energy, it may work for a prolonged time and the spare power source scheme is more convenient than the prior art.

While the invention has been described in terms of what is presently considered to be the most practical and preferred embodiments, it is to be understood that the invention needs not be limited to the disclose embodiments. Therefore, it is intended to cover various modifications and similar arrangements included within the spirit and scope of the appended claims, which are to be accorded with the broadest interpretation so as to encompass all such modifications and similar structures.

What is claimed is:

1. A mobile communication device, comprising:
   a processing unit;
   a battery unit connecting to the processing unit to function as a main power source of the processing unit, and supplying the main power to the processing unit by providing a first working current for the processing unit;
   a solar cell unit connecting to the processing unit to function as a spare power source of the processing unit, receiving and transforming luminance into an analog voltage, and providing a charging current for the battery unit and supplying the spare power to the processing unit by providing a second working current for the processing unit;
   an analog-to-digital converter connecting to the processing unit and the solar cell unit for converting the analog voltage from the solar cell unit into a digital voltage and transmitting the digital voltage to the processing unit; and
   an electronic switch circuit connecting to the processing unit and the solar cell unit,
   wherein the processing unit generates a control signal from the digital voltage depending on the relative size of the first working current and the second working current, and the control signal is used to control the electronic switch circuit to turn the solar cell unit on or off; when the first working current is greater than the second working current, the control signal controls the electronic switch circuit to turn the solar cell unit off; when the solar cell unit is turned on, the solar cell unit provides power for the processing unit; and when the solar cell unit is turned off, the solar cell unit doesn't provide power for the processing unit.

2. The mobile communication device as claimed in claim 1, wherein the digital voltage is transformed into a luminance value.

3. The mobile communication device as claimed in claim 2, wherein the luminance value represents a warning value.

4. The mobile communication device as claimed in claim 1, wherein the battery unit is a rechargeable battery.

5. The mobile communication device as claimed in claim 1, wherein the solar cell unit is a photoelectric cell.

6. The mobile communication device as claimed in claim 1, wherein when the solar cell unit is turned on, the solar cell unit electrically connects to the battery unit and provides not only the second working current for the processing unit but also the charging current for the battery unit.

7. The mobile communication device as claimed in claim 1, wherein when the solar cell unit is turned off, the solar cell unit is isolated from the battery unit and the battery unit provides the first working current for the processing unit.

8. A mobile communication device, comprising:
   a processing unit;
   a battery unit connecting to the processing unit to function as a main power source of the processing unit, and supplying the main power to the processing unit by providing a first working current for the processing unit;

a solar cell unit connecting to the processing unit to function as a spare power source of the processing unit, receiving and transforming luminance into an analog voltage, and providing a charging current for the battery unit and supplying the spare power to the processing unit by providing a second working current for the processing unit;

an analog-to-digital converter connecting to the processing unit and the solar cell unit for converting the analog voltage from the solar cell unit into a digital voltage and transmitting the digital voltage to the processing unit;

an electronic switch circuit connecting to the processing unit and the solar cell unit, wherein the processing unit generates a control signal from the digital voltage depending on the relative size of the first working current and the second working current, and the control signal is used to control the electronic switch circuit to turn the solar cell unit on or off; when the first working current is less than the second working current, the control signal controls the electronic switch circuit to turn the solar cell unit on; when the solar cell unit is turned on, the solar cell unit provides power for the processing unit; and when the solar cell unit is turned off, the solar cell unit doesn't provide power for the processing unit.

9. A mobile communication device, comprising:

a processing unit;

a battery unit connecting to the processing unit to function as a main power source of the processing unit, and supplying the main power to the processing unit by providing a first working current for the processing unit;

a solar cell unit connecting to the processing unit to function as a spare power source of the processing unit, receiving and transforming luminance into an analog voltage, and providing a charging current for the battery unit and supplying the spare power to the processing unit by providing a second working current for the processing unit; and a circuit system connecting to the processing unit and the solar cell unit for converting the analog voltage from the solar cell unit into a digital voltage and transmitting the digital voltage to the processing unit, wherein the processing unit generates a control signal from the digital voltage depending on the relative size of the first working current and the second working current, and the control signal is used to turn the solar cell unit on or off; when the first working current is greater than the second working current, the control signal is used to turn the solar cell unit off; when the first working current is less than the second working current, the control signal is used to turn the solar cell unit on; when the solar cell unit is turned on, the solar cell unit provides power for the processing unit; and when the solar cell unit is turned off, the solar cell unit doesn't provide power for the processing unit.

10. The mobile communication device as claimed in claim 9, further comprising an electronic switch circuit connecting to the processing unit and the solar cell unit, wherein the control signal is used to control the electronic switch circuit to turn the solar cell unit on or off.

11. The mobile communication device as claimed in claim 9, wherein the circuit system comprises an analog-to-digital converter.

12. The mobile communication device as claimed in claim 8, wherein the digital voltage is transformed into a luminance value.

13. The mobile communication device as claimed in claim 8, wherein the battery unit is a rechargeable battery.

14. The mobile communication device as claimed in claim 8, wherein when the solar cell unit is turned on, the solar cell unit electrically connects to the battery unit and provides not only the second working current for the processing unit but also the charging current for the battery unit.

15. The mobile communication device as claimed in claim 8, wherein when the solar cell unit is turned off, the solar cell unit is isolated from the battery unit and the battery unit provides the first working current for the processing unit.

* * * * *